United States Patent [19]

Markovics

[11] Patent Number: 4,627,640

[45] Date of Patent: Dec. 9, 1986

[54] ALBUM WITH FOLDABLE SHEETS

[75] Inventor: Margaret Markovics, Upper St. Clair, Pa.

[73] Assignee: ACT Laboratories, McMurray, Pa.

[21] Appl. No.: 780,896

[22] Filed: Sep. 27, 1985

[51] Int. Cl.[4] .......... B42D 19/00; B42D 3/18; G09B 29/04; G09F 1/00

[52] U.S. Cl. .......... 281/5; 281/1; 283/34; 283/35; 40/124.1

[58] Field of Search .......... 281/1, 5; 283/34, 35; 229/92.8; 40/530, 124.1, 539; D19/1

[56] References Cited

U.S. PATENT DOCUMENTS

| | | | |
|---|---|---|---|
| 858,313 | 6/1907 | Wells | 229/92.8 |
| 1,531,065 | 3/1925 | Boyer . | |
| 2,525,937 | 10/1950 | Palm | 281/1 |
| 2,546,878 | 3/1951 | Townley | 46/34 |
| 2,615,732 | 10/1952 | Falk | 283/34 |
| 2,824,394 | 2/1958 | Lohnes | 40/124.1 |
| 3,753,558 | 8/1973 | Sheroff et al. | 270/67 |
| 4,289,333 | 9/1981 | Gaetano | 283/35 |
| 4,502,711 | 3/1985 | Muth | 281/5 |

*Primary Examiner*—Paul A. Bell
*Assistant Examiner*—Paul M. Heyrana, Sr.
*Attorney, Agent, or Firm*—Webb, Burden, Robinson & Webb

[57] ABSTRACT

An automatically foldable and unfoldable album assembly includes a front cover and a rear cover hingedly joined together and a plurality of foldable sheets joined together in strip fashion. Each sheet contains four panels which are joined together along diagonal fold lines. A pair of opposed inner panels are provided with central vertical folds. The outer panels of adjacent sheets are joined together and are joined to the front and rear cover to form a strip. When one sheet is closed, a sheet adjacent thereto will automatically be opened.

12 Claims, 10 Drawing Figures

ALBUM WITH FOLDABLE SHEETS

BACKGROUND OF THE INVENTION (1) Field of the Invention

This invention relates to an automatically foldable and unfoldable album or book assembly and, more particularly, to such an album which includes a plurality of foldable sheets joined together in a strip fashion.

(2) Description of the Prior Art

Foldable sheets, which may be collapsed or folded together so as to occupy a fraction of the space occupied in the unfolded state, are well known in the prior art. A variety of foldable sheet configurations have been developed and examples of these are shown in U.S. Pat. Nos. 2,525,937; 3,753,558 and 4,502,711. These sheets are automatically unfolded and folded when opened and closed. The use of a strip type of configuration for books, greeting cards and the like is also well known in the prior art. Examples of these arrangements are shown in U.S. Pat. Nos. 1,531,065; 2,546,878; 2,615,732; 2,824,394; and 4,289,333. While the maps shown in U.S. Pat. Nos. 1,531,065; 2,615,732 and 4,289,333 are also partially folded, these are simple folds and these maps do not automatically unfold and fold when opened and closed.

It is an object of the present invention to provide a book or album which has foldable sheets which are automatically unfolded and folded when the book is opened and closed, but which also has a plurality of sheets joined together in a strip fashion.

It is another object of the present invention to provide such an album in which each foldable sheet is automatically folded and unfolded with a single turn.

It is a further object of the present invention to provide such an album in which, with a single turn, a subsequent sheet is unfolded automatically while the immediately preceding sheet is being closed.

It is yet another object of the present invention to provide such an album which is easy to use, which is inexpensive and simple to manufacture, and which can be provided in a variety of attractive shapes and configurations.

SUMMARY OF THE INVENTION

Accordingly I have invented an automatically foldable and unfoldable album assembly which includes a front cover and rear cover hingedly joined together and having a plurality of foldable sheets joined together in a strip fashion. Each of the foldable sheets is formed from a first outer panel, a second outer panel, a first inner panel and a second panel, with the first inner panel disposed between the outer panels and with the second inner panel disposed opposite the first inner panel and between the outer panels. All of the panels are joined together along diagonal fold lines. Each panel is confined within the diagonal quadrants of a square and the outer panels have the same configuration. The inner panels each have a central vertical fold extending therethrough and the inner panels are complementary with the outer panels whereby when the sheet is moved to a folded configuration the inner panels fold toward each other and are completely enclosed by the outer panels. In order to join the panels together in a strip fashion the rear surface of the first outer panel of a first of the sheets is joined to the front cover, a rear surface of the second outer panel of the last of the foldable sheets is joined to the rear cover and a rear surface of the second outer panel of each of the remaining sheets except for the last sheet is joined to a rear surface of the first outer panel of the sheet immediately adjacent thereto.

In a preferred embodiment, the outer panels and the inner panels of the foldable sheets are each identical in configuration and are symmetrical about a center line passing therethrough. The inner panels will be symmetrical about the central vertical fold. The sheets, and hence the album, can be provided in a variety of shapes or configurations such as a heart, cone, circle, football, and shamrock. It is also preferred that the album include some means for securing the front and rear covers together when the album is in the folded configuration, such as flexible strips attached to the covers. It is also preferred that the front and rear covers have the same configuration as the outer panels of the foldable sheets.

DESCRIPTION OF THE PREFERRED EMBODIMENTS

Figure 1:
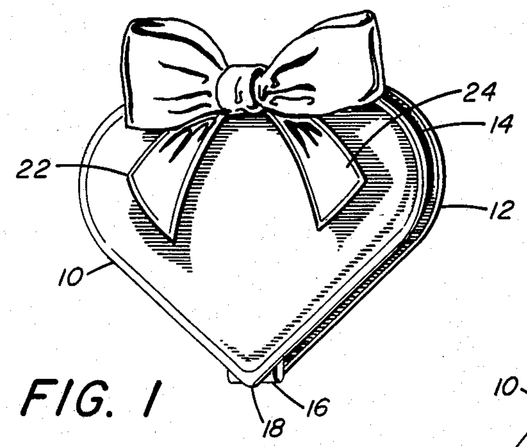
FIG. 1 is a plan view of a first embodiment of an album with a plurality of foldable sheets in accordance with the present invention and in the closed position.

A first embodiment of an album with foldable sheets in accordance with the present invention is shown in FIGS. 1-5. The album includes a front cover 10, a rear cover 12 and a plurality of foldable sheets 14 disposed therebetween. In this first embodiment, the album covers 10 and 12 are provided in the configuration of a heart, although as discussed below, other shapes or configurations are possible. The front cover 10 and rear cover 12 are hingedly joined together by a hinge 16 affixed thereto. The hinge 16 is located at the pointed or lower end 18 of front cover 10 and the pointed or lower end 20 of rear cover 12. The hinge 16 is ideally a length of flexible material. The precise length of hinge 16 is determined by the thickness of the album which, in turn, is determined by the number of sheets 14 included therein. The front cover 10 and rear cover 12 may include tapes or ribbon strips 22 and 24 along an edge opposite pointed ends 18 and 20, respectively, so that the covers 10, 12 may be securely tied together.

Figure 2:
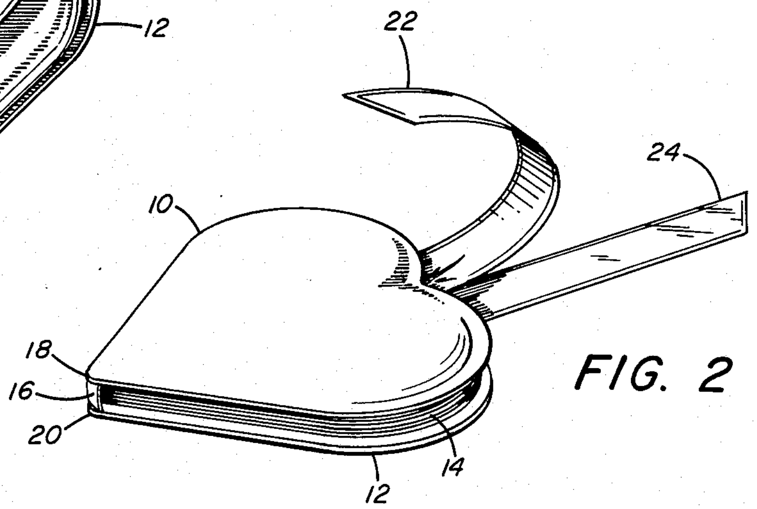
FIG. 2 is a perspective view of the album shown in FIG. 1 with the ribbon strips untied.
Figure 3:
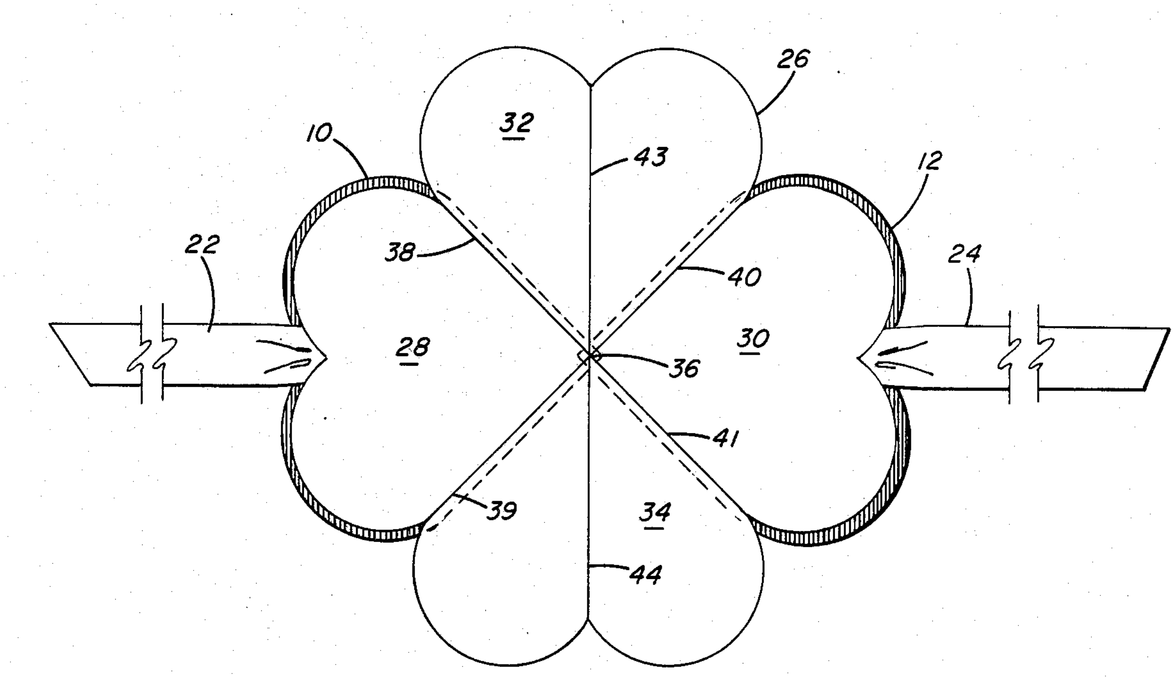
FIG. 3 is a top plan view of the album shown in FIG. 1 with the album open and with one of the foldable sheets completely unfolded.

The album is shown in FIGS. 1 and 2 in the folded or closed position with all of the foldable sheets 14 collapsed and located entirely between the front cover 10 and the rear cover 12. FIG. 3 shows the album in the unfolded or open position and shows one foldable sheet, namely, sheet 26, flat and completely unfolded. Sheet 26 is typical of the remaining foldable sheets 14 which are not visible in FIG. 3.

Foldable sheet 26 is formed from four panels, namely, first outer panel 28, second outer panel 30, first inner panel 32 and second inner panel 34 all joined together along adjacent edges to form a unitary sheet. As shown in FIG. 3, the first inner panel 32 is positioned between the first outer panel 28 and the second outer panel 30, which are positioned opposite each other. The second inner panel 34 is disposed opposite the first inner panel 32 and between the first outer panel 28 and the second outer panel 30. The panels of sheet 26 have V-shaped ends which taper toward the center 36 of the sheet 26. The V-shaped ends of each panel abuts and joins with adjacent panels along diagonal fold lines which extend outwardly from the center 36 of the sheet 26. Panel 28 is joined to panel 32 along diagonal fold line 38 and to panel 34 along diagonal fold line 39. Likewise, panel 30 is joined to panel 32 along diagonal fold line 40 and to panel 34 along diagonal fold line 41. Each diagonal fold line is angularly spaced from an immediately adjacent fold line by 90°. First inner panel 32 includes central fold line 43 which extend outwardly from the center 36 of sheet 26 to the outer edge of sheet 26, bisecting the angle between diagonal fold lines 38 and 40 and, thus, bisecting the first inner panel 32. Similarly, second inner panel 34 includes central fold line 44 extending outwardly from the center 36 of sheet 26 to the outer edge of sheet 26, bisecting the angle between diagonal fold lines 39 and 41 and bisecting the second inner panel 34.

The diagonal folds 38, 39, 40, and 41 are all directed toward the rear or lower surface of sheet 26 as viewed in FIG. 3. The central folds 43 and 44 are directed toward the front or upper surface of sheet 26. By "directed toward", it is meant that the edge or ridge of the fold is on the rear surface or on the front surface of the sheet 26, respectively.

Figure 4:
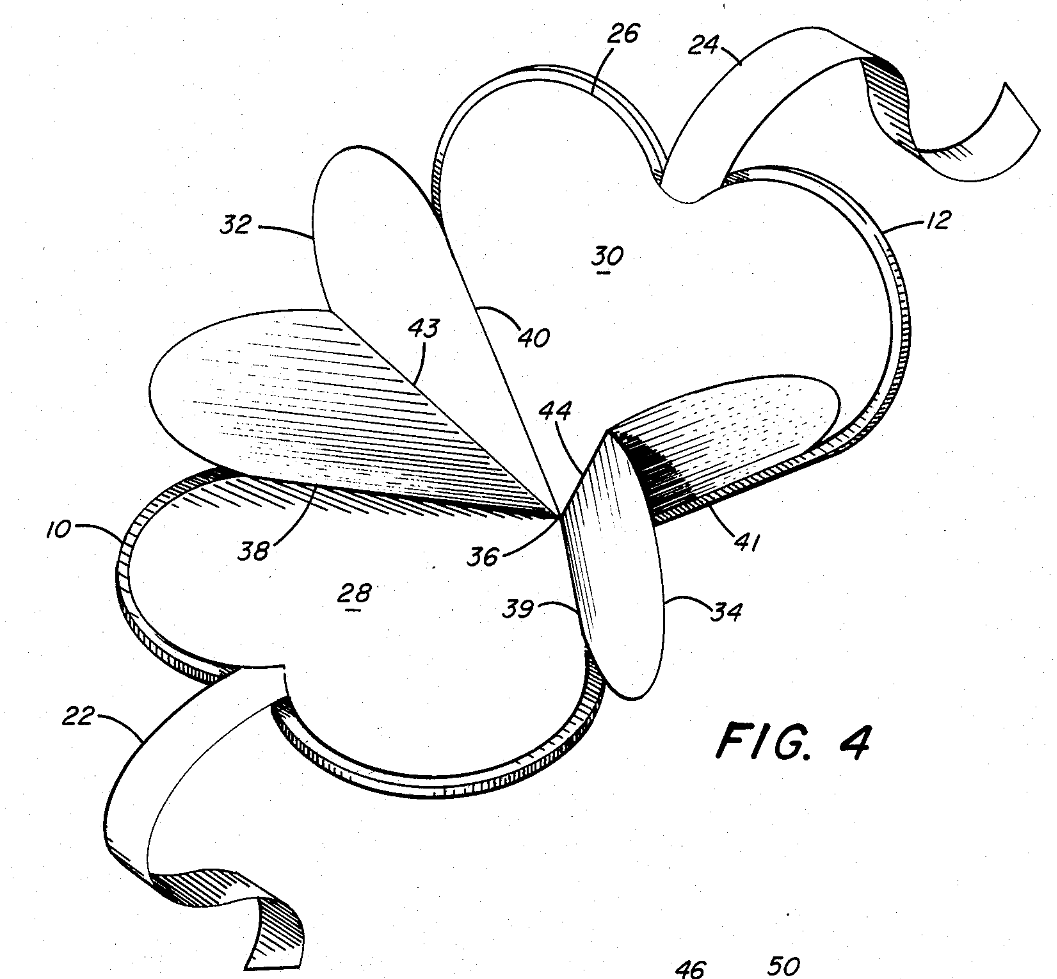
FIG. 4 is a perspective view of the album shown in FIG. 1 with one foldable sheet partially unfolded.

The inner panels 32, 34 are complementary with the outer panels 28, 30 whereby when the sheet 26 is moved to a folded configuration, the inner panels 32, 34 fold inwardly toward each other and are completely enclosed or covered by the outer panels 28, 30. This can be explained with reference to FIGS. 3 and 4. The foldable sheet 26 has an inherent fold memory whereby the sheet 26 automatically folds and unfolds along the various fold lines. To close the album shown in FIGS. 1–5, one of the outer panels is moved toward the other outer panel. As shown in FIG. 4, second outer panel 30 is being moved toward first outer panel 28. As this occurs, the first inner panel 32 folds along diagonal fold lines 38 and 40 and along central fold line 43 and the second inner panel 34 folds along diagonal fold lines 39 and 41 and along central fold line 44. Due to the arrangement of the fold lines, the inner panels 32, 34 will automatically fold inwardly and toward each other, with central fold lines 43 and 44 approaching and eventually abutting, each other. At the same time, the outer panels 28 and 30 approach, and eventually abut, the inner panels 32, 34. When the album is completely closed, one-half of inner panel 32 abuts outer panel 28 and the remaining half abuts outer panel 30. Similarly, one-half of inner panel 34 abuts outer panel 28 and the other half abuts outer panel 30. Since the inner panels are 32, 34 complementary with, and no larger than, the outer panels 28, 30, the inner panels 32, 34 are completely surrounded by the outer panels 28, 30 when the album is closed. When the album is opened, the above described motion of foldable sheet 26 is reversed and the sheet 26 is moved to the open configuration shown in FIG. 3.

In a preferred embodiment, the panels of the foldable sheet 26 are identical in size and configuration with each other and are each symmetrical about a center line therethrough. For example, panel 32 is symmetrical about central fold line 43. In addition, the panels preferably have the same shape or configuration as the front cover 10 and rear cover 12. In the embodiment shown in FIGS. 1–5, each panel is heart shaped and of the same size and configuration as the other panels. The front and rear covers 10, 12 are also heart shaped. The covers 10, 12 are preferably slightly larger than the folded sheets 14 so that some measure of edge protection for the sheets 14 is afforded.

The album of the present invention includes a plurality of foldable sheets which are joined to the album cover and which are joined to each other in a strip fashion. In particular, the rear surface of the first outer panel of the first of these foldable sheets is affixed to the front cover of the album. The rear surface of the second outer panel of the first foldable sheet is affixed to the rear surface of the first outer panel of the next adjacent sheet. The remaining foldable sheets are joined together in this fashion by connecting the rear surface of the adjacent outer panels together. The rear surface of the second outer panel of the last of these foldable sheets is then affixed to the rear cover of the album.

Figure 5:
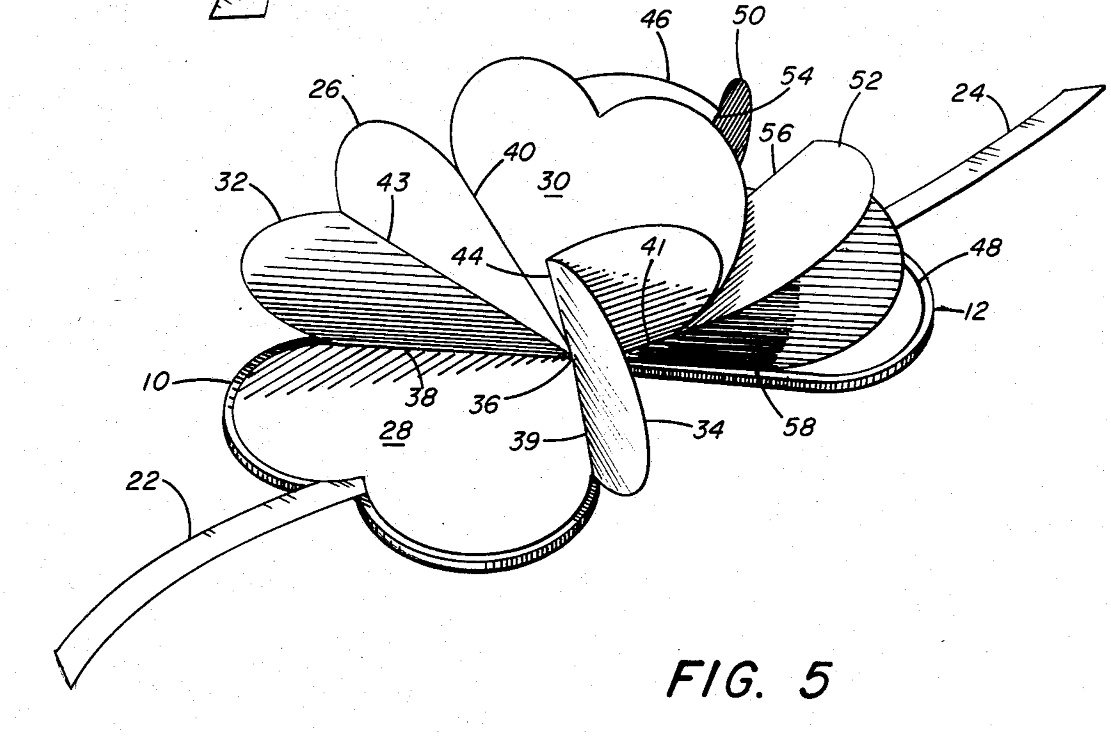
FIG. 5 is a perspective view of the album shown in FIG. 1 with two adjacent foldable sheets partially unfolded.

FIG. 5 shows the joining of the foldable sheets together and the operation of the album with such foldable sheets. Foldable sheet 26 is shown joined to a second foldable sheet 46. Foldable sheet 46 has an identical configuration to foldable sheet 26 and includes a first outer panel (not visible), a second outer panel 48, a first inner panel 50 and a second inner panel 52. Inner panel 50 includes a central fold 54 and inner panel 52 includes a central fold 56. The panels of sheet 46 are joined together along diagonal folds; however, only diagonal fold 58 joining inner panel 52 to outer panel 48 is visible in FIG. 5. The rear surface of first outer panel 28 of sheet 26 is affixed to the inner surface of the front cover 10. The rear surface of the second outer panel 30 of sheet 26 is affixed to the rear surface of the first outer panel of sheet 46. The rear surface of the second outer panel 48 of sheet 46 is affixed to the rear surface of the first outer panel of the next adjacent foldable sheet. If the album included only two foldable sheets, then the rear surface of panel 48 of sheet 46 would be affixed directly to the inner surface of the rear cover 12.

The operation of the album with a plurality of sheets is similar to that described above in connection with FIG. 4. By grasping the second outer panel 30 of sheet 26 and the first outer panel of sheet 46, which are joined together to form a unitary panel, and moving these panels toward panel 28, sheet 26 will begin to close while sheet 46 begins to open. This is illustrated in FIG. 5 showing sheets 26 and 46 each in an intermediate, partially folded position. By continuing to move panel 30 toward panel 28, sheet 26 will eventually close and sheet 46 will eventually open completely and resemble the configuration shown in FIG. 3. The remaining sheets can be opened in a similar fashion.

Due to the nature of the folded sheets and their inherent fold memory, the sheets will be folded and unfolded automatically with a single turn. Since the sheets are joined together in a strip fashion, opening one sheet will automatically close another sheet, and vice versa, again with only a single turn.

Figure 6:
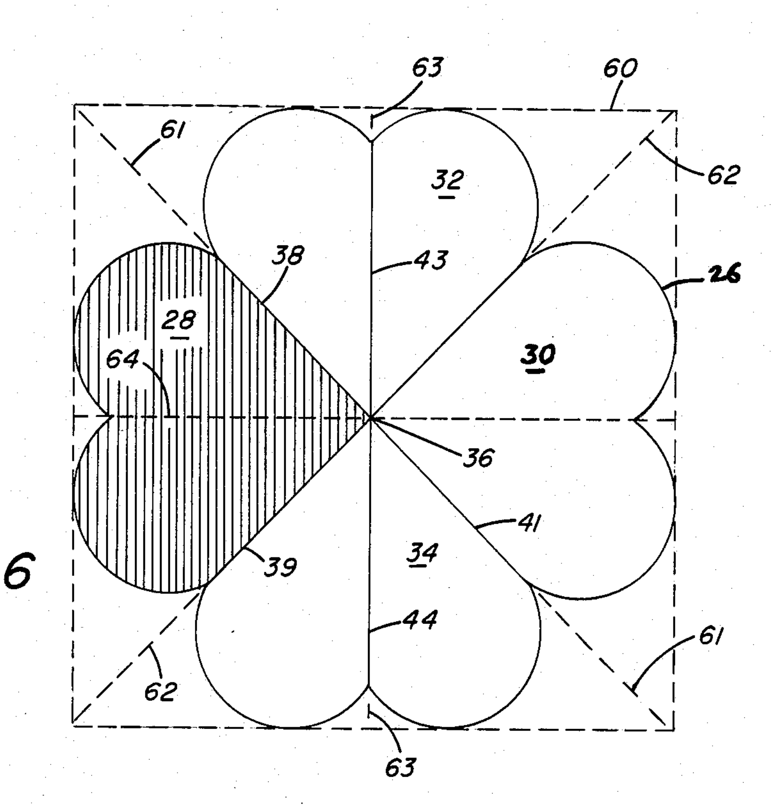
FIG. 6 is a plan view of a foldable sheet in the album shown in FIG. 1.

FIG. 6 is a plan view of foldable sheet 26 with the outline of a square 60, divided with diagonal and cross lines, superimposed thereon. Sheet 26 is formed to fit completely within the confines of a square 60. Diagonal fold lines 38, 39, 40, and 41 follow along diagonal lines 61, 62 extending from opposite corners of the square 60. Central fold lines 43 and 44 follow along cross line 63 extending between and bisecting opposed sides of the square 60. Panel 28 and panel 30 are symmetrical about cross line 64 which extends between and bisects the remaining sides of the square 60. It can be seen in FIG. 6 that the panels 28, 30, 32, and 34 are each confined within a separate diagonal quadrant of the square.

While the foldable sheet 26 shown in FIGS. 1–6 has four identical panels, each of which are symmetrical about their vertical center, this arrangement is not absolutely necessary. All that is needed for a foldable sheet to function in the present invention is: (a) for the panels to be confined within the diagonal quadrants of a square, (b) for the outer panels to be identical in configuration, (c) for the panels to be joined along diagonal folds, (d) for the inner panels to have a central vertical fold, and (e) for the inner panels to be complementary with the outer panels. In this manner, the sheets can be joined together in a strip fashion and the inner panels will fold inwardly toward each other and be completely enclosed by the outer panels when the sheets are closed.

Figure 7:
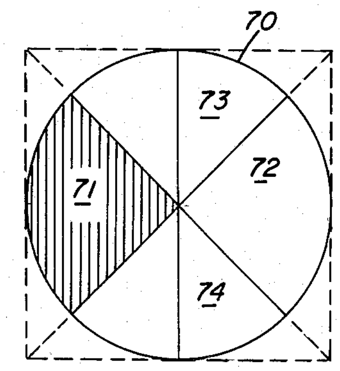
FIG. 7 is a plan view of a second embodiment of a foldable sheet in accordance with the present invention.
Figure 8:
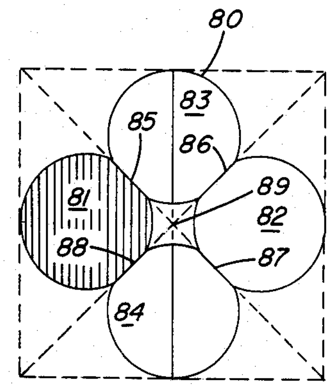
FIG. 8 is a plan view of a third embodiment of a foldable sheet in accordance with the present invention.
Figure 9:
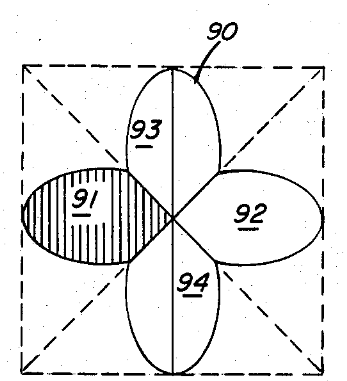
FIG. 9 is a plan view of a fourth embodiment of a foldable sheet in accordance with the present invention.
Figure 10:
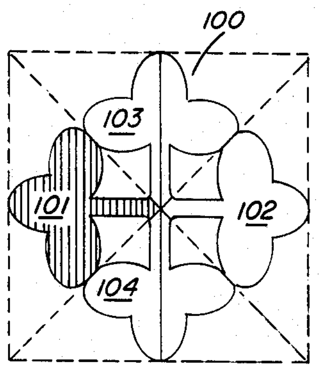
FIG. 10 is a plan view of a fifth embodiment of a foldable sheet in accordance with the present invention.

The configuration of the foldable sheet when closed will be dictated by the configuration of the outer panels of the sheet. It is preferable that the covers follow the shape of the outer panels of the sheets contained therein. The album shown in FIGS. 1–6 has heart shaped panels and the shape of the sheets when closed is illustrated by shaded panel 28 in FIG. 6. Many other shapes for the foldable sheets are possible and several examples are shown in FIGS. 7–10. FIG. 7 shows sheet 70 which is comprised of cone shaped panels 71, 72, 73, and 74. Sheet 70 has a circular configuration when opened or unfolded and a cone shaped configuration, as shown in shaded panel 71, when closed. FIG. 8 shows sheet 80 which is comprised of circular shaped panels 81, 82, 83 and 84. Sheet 80 also shows that the panels need not have V-shaped ends meeting at the center of the sheet. The diagonal folds 85-88 of sheet 80 terminate short of the center 89 thereof. FIG. 9 shows sheet 90 which includes panels 91, 92, 93 and 94 which have the approximate shape of a football. Sheet 90 has a star shaped configuration when opened. FIG. 10 shows sheet 100 which is comprised of shamrock shaped panels 101-104.

Having described hereinabove the preferred embodiments of the present invention, it is to be understood that the invention may be otherwise embodied within the scope of the appended claims.

I claim:

1. An automatically foldable and unfoldable album assembly comprising a front cover and a rear cover hingedly joined together and with a plurality of foldable sheets joined together in strip fashion, each of said foldable sheets formed from a first outer panel, a second outer panel, a first inner panel and a second inner panel, with said first inner panel disposed between said outer panels and joined thereto along diagonal fold lines, with said second inner panel disposed opposite said first inner panel and between said outer panels and joined thereto along diagonal fold lines, said panels each being confined within the diagonal quadrants of a square, each of said outer panels having the same configuration, each of said inner panels having a central vertical fold extending therethrough, said inner panels being complementary with said outer panels whereby when said sheet is moved to a folded configuration, said inner panels fold inwardly toward each other and are completely enclosed by said outer panels, with a rear surface of the first outer panel of a first of said sheets joined to said front cover, with a rear surface of the second outer panel of the last of said sheets joined to said rear cover, and with a rear surface of the second outer panel of each of the sheets, except for the last sheet, joined to a rear surface of the first outer panel of the sheet immediately adjacent thereto, whereby when one sheet is moved to a closed configuration the sheet immediately adjacent thereto will automatically be moved to an open configuration.

2. The album assembly of claim 1 wherein the outer panels of said foldable sheets are each symmetrical about a center line passing therethrough.

3. The album assembly of claim 2 wherein the inner panels of said foldable sheets are each symmetrical about said central vertical fold.

4. The album assembly of claim 3 wherein said inner panels have the same configuration of said outer panels.

5. The album assembly of claim 4 wherein said inner panels and outer panels of said foldable sheets are formed with the configuration of a heart.

6. The album assembly of claim 4 wherein said inner panels and outer panels of said foldable sheets are formed with the configuration of a cone.

7. The album assembly of claim 4 wherein said inner panels and outer panels of said foldable sheets are formed with the configuration of a circle.

8. The album assembly of claim 4 wherein said inner panels and outer panels of said foldable sheets are formed with the configuration of a football.

9. The album assembly of claim 4 wherein said inner panels and outer panels of said foldable sheets are formed with the configuration of a shamrock.

10. The album assembly of claim 1 further including means for securing said front cover to said rear cover when the album is in the folded configuration.

11. The album assembly of claim 10 wherein said securing means is a first flexible strip attached to said front cover and a second flexible strip attached to said rear cover.

12. The album assembly of claim 1 wherein said front cover and said rear cover have the same configuration of said outer panels.

* * * * *